(No Model.)

S. HEIMANN.
CARBON ELECTRODE FOR ELECTRIC ARC LAMPS.

No. 541,541. Patented June 25, 1895.

Fig. 1 — Carbon. Coating of infusorial earth, chloride of zinc, chloride of ammonia, and yellow prussiate of potash.

Fig. 2 — Mixture of infusorial earth, chloride of zinc, chloride of ammonia, and yellow prussiate of potash.

Witnesses
L. Petri-Palmedz
Emil Mueller.

S. Heimann Inventor
By his Attorney
Oscar F. Gunz

UNITED STATES PATENT OFFICE.

SALOMON HEIMANN, OF NEW YORK, N. Y., ASSIGNOR TO LEOPOLD KATZENSTEIN, OF SAME PLACE.

CARBON ELECTRODE FOR ELECTRIC-ARC LAMPS.

SPECIFICATION forming part of Letters Patent No. 541,541, dated June 25, 1895.

Application filed October 5, 1894. Serial No. 524,989. (No model.)

*To all whom it may concern:*

Be it known that I, SALOMON HEIMANN, a citizen of Germany, and a resident of the city of New York, in the county of New York and State of New York, have invented certain new and useful Improvements in Carbon Electrodes for Electric-Arc Lamps, of which the following is a specification.

This invention relates to improvements in carbon electrodes for electric arc lamps.

In the accompanying drawings, forming a part of this specification, Figure 1 is a side view of my improved coated carbon, part being in section. Fig. 2 is a side view of my improved uncoated carbon, part being in section.

The object of my invention is to provide a new and improved carbon electrode for continuous and alternating current arc lamps, which electrode is consumed in considerably less time than the carbon electrodes in use heretofore.

The invention consists in an electric lamp carbon electrode in which is incorporated a mixture of infusorial earth, chloride of zinc, chloride of ammonia and yellow prussiate of potash in the manner that will be fully set forth hereinafter.

In carrying out my invention I mix ten parts, by weight, of infusorial earth, with forty-five parts of chloride of zinc, forty-three parts of chloride of ammonia and two parts of yellow prussiate of potash until the mixture has about the consistency of thick cream. The carbons are dipped into this mixture and are permitted to remain in the same for from three to four hours, and are then removed, permitted to drip off and are dried. In place of coating the carbons the above ingredients may be mixed with the corresponding portions of carbon and then shaped into electrodes, which are pressed and dried in the usual manner.

My improved carbons burn from thirty-five to fifty per cent. longer than the ordinary carbons, in use heretofore.

Having thus described my invention, what I claim as new, and desire to secure by Letters Patent, is—

A carbon electrode for electric arc lamps, in which are incorporated, infusorial earth, chloride of zinc, chloride of ammonia and yellow prussiate of potash, about in the proportions given and substantially as herein set forth.

In testimony that I claim the foregoing as my invention I have signed my name, in presence of two witnesses, this 11th day of September, 1894.

SALOMON HEIMANN.

Witnesses:
 OSCAR F. GUNZ,
 D. PETRI-PALMEDO.